US010502282B2

United States Patent
Fujii

(10) Patent No.: US 10,502,282 B2
(45) Date of Patent: Dec. 10, 2019

(54) DRIVE DEVICE

(71) Applicant: ASMO CO., LTD., Shizuoka-ken (JP)

(72) Inventor: Yasufumi Fujii, Toyohashi (JP)

(73) Assignee: Denso Corporation, Kariva (JP)

( * ) Notice: Subject to any disclaimer, the term of this patent is extended or adjusted under 35 U.S.C. 154(b) by 300 days.

(21) Appl. No.: 14/881,642

(22) Filed: Oct. 13, 2015

(65) Prior Publication Data

US 2016/0169326 A1     Jun. 16, 2016

(30) Foreign Application Priority Data

Oct. 17, 2014   (JP) .................................. 2014-212762
Oct. 9, 2015    (JP) .................................. 2015-201145

(51) Int. Cl.

| F16H 1/08 | (2006.01) |
| F16H 57/031 | (2012.01) |
| F16H 57/039 | (2012.01) |
| F16H 57/023 | (2012.01) |
| F16H 57/028 | (2012.01) |
| F16H 1/16 | (2006.01) |

(52) U.S. Cl.
CPC ............. *F16H 1/08* (2013.01); *F16H 57/031* (2013.01); *F16H 1/16* (2013.01); *F16H 57/023* (2013.01); *F16H 57/028* (2013.01); *F16H 57/039* (2013.01)

(58) Field of Classification Search
CPC . F16H 1/08; F16H 1/16; F16H 57/023; F16H 57/031; F16H 57/039; F16H 57/028
USPC ...................... 74/665 GD, 414, 458, DIG. 10
See application file for complete search history.

(56) References Cited

U.S. PATENT DOCUMENTS

| 5,832,780 A * | 11/1998 | Gallienne ................. F16H 1/16 74/425 |
| 7,834,499 B2 * | 11/2010 | Acosta ..................... F16H 1/203 310/100 |
| 2008/0016974 A1 * | 1/2008 | Watanabe ............... F16H 55/17 74/438 |
| 2016/0033008 A1 * | 2/2016 | Mao .......................... F16H 1/16 74/434 |

FOREIGN PATENT DOCUMENTS

| JP | 2010-261514 A | 11/2010 |
| JP | 2012080775 A | 4/2012 |
| JP | 2013-029150 A | 2/2013 |
| JP | 5335107 B2 | 11/2013 |

* cited by examiner

*Primary Examiner* — Terence Boes
*Assistant Examiner* — Randell J Krug
(74) *Attorney, Agent, or Firm* — Patterson Thuente Pedersen, P.A.

(57) ABSTRACT

A drive device includes a reduction drive, an accommodation portion, and an output unit. The reduction drive includes at least two resin helical gears meshed with each other. The at least two helical gears include an output-side helical gear and another helical gear. The output-side helical gear is located closer to the output unit than the other helical gear in a power transmission path of the reduction drive. The housing cover includes a restriction portion located within a range that includes a straight line intersecting the first center axis and the second center axis. The restriction portion projects toward a bottom of the gear accommodation portion. The restriction portion is configured to allow for slidable contact with the output-side helical gear to restrict axial bending of the output-side helical gear.

8 Claims, 6 Drawing Sheets

DRIVE DEVICE

BACKGROUND ART

The present invention relates to a drive device.

A conventional drive device includes a reduction drive that includes a worm, which is driven by a motor, and a gear, to which rotation of the worm is transmitted. The reduction drive is accommodated in an accommodation portion. The drive device reduces the speed of the rotation produced by the motor with the reduction drive and outputs the rotation to the outside from an output unit, which is coupled to the reduction drive. For example, Japanese Patent No. 5335107 describes a drive device including an accommodation portion that includes an annular support projection. The support projection projects in the same direction as a support shaft that supports a worm wheel, which meshes with a worm. The support projection supports the worm wheel in a slidable manner.

Resin gears are less expensive than metal gears, and helical gears produce less vibration and noise and have stronger teeth than spur gears. Thus, resin helical gears are used in a reduction drive. However, meshed helical gears generate a thrust force. Further, when meshed helical gears reduce the rotation speed of a worm, the helical gear that is close to an output unit in a power transmission path of a reduction drive has a larger diameter than a helical gear that is far from the output unit. This increases the distance between the center of the rotation and the meshed portion. Thus, when, for example, movement of the output unit is constrained while the motor is being driven, a large load is applied to the output unit. This increases the thrust force at the meshed portion of the helical gears and causes the helical gear that is close to the output unit in the power transmission path of the reduction drive to be greatly bent in the axial direction. As a result, the meshing of the helical gears may become insufficient. Further, it is difficult to avoid insufficient meshing of the helical gears with only the support projection that supports the worm wheel, which meshes with the worm, as described in the above document.

SUMMARY OF THE INVENTION

It is an object of the present invention to provide a drive device that reduces situations in which the helical gears are insufficiently meshed.

To achieve the above object, a drive device according to one embodiment of the present invention includes a drive device, a reduction drive, and an output unit. The reduction drive reduces a speed of rotation produced by a motor. The reduction drive includes at least two resin helical gears meshed with each other. The accommodation portion accommodates the reduction drive. The accommodation portion includes rotation supports that respectively support the at least two helical gears in a rotatable manner. The output unit outputs the rotation, of which the speed has been reduced by the reduction drive, to an outer side. The accommodation portion includes a gear housing, which includes a gear accommodation portion capable of accommodating the at least two helical gears, and a housing cover, which closes an opening of the gear accommodation portion. The at least two helical gears include an output-side helical gear and another helical gear. The output-side helical gear is located closer to the output unit than the other helical gear in a power transmission path of the reduction drive. The rotation supports include a rotation support that supports the output-side helical gear and includes a first center axis and a rotation support that supports the other helical gear and includes a second center axis. The housing cover includes a restriction portion located within a range that includes a straight line intersecting the first center axis and the second center axis. The restriction portion projects toward a bottom of the gear accommodation portion. The restriction portion is configured to allow for slidable contact with the output-side helical gear to restrict axial bending of the output-side helical gear.

DETAILED DESCRIPTION OF THE PREFERRED EMBODIMENTS

First Embodiment

Figure 1:
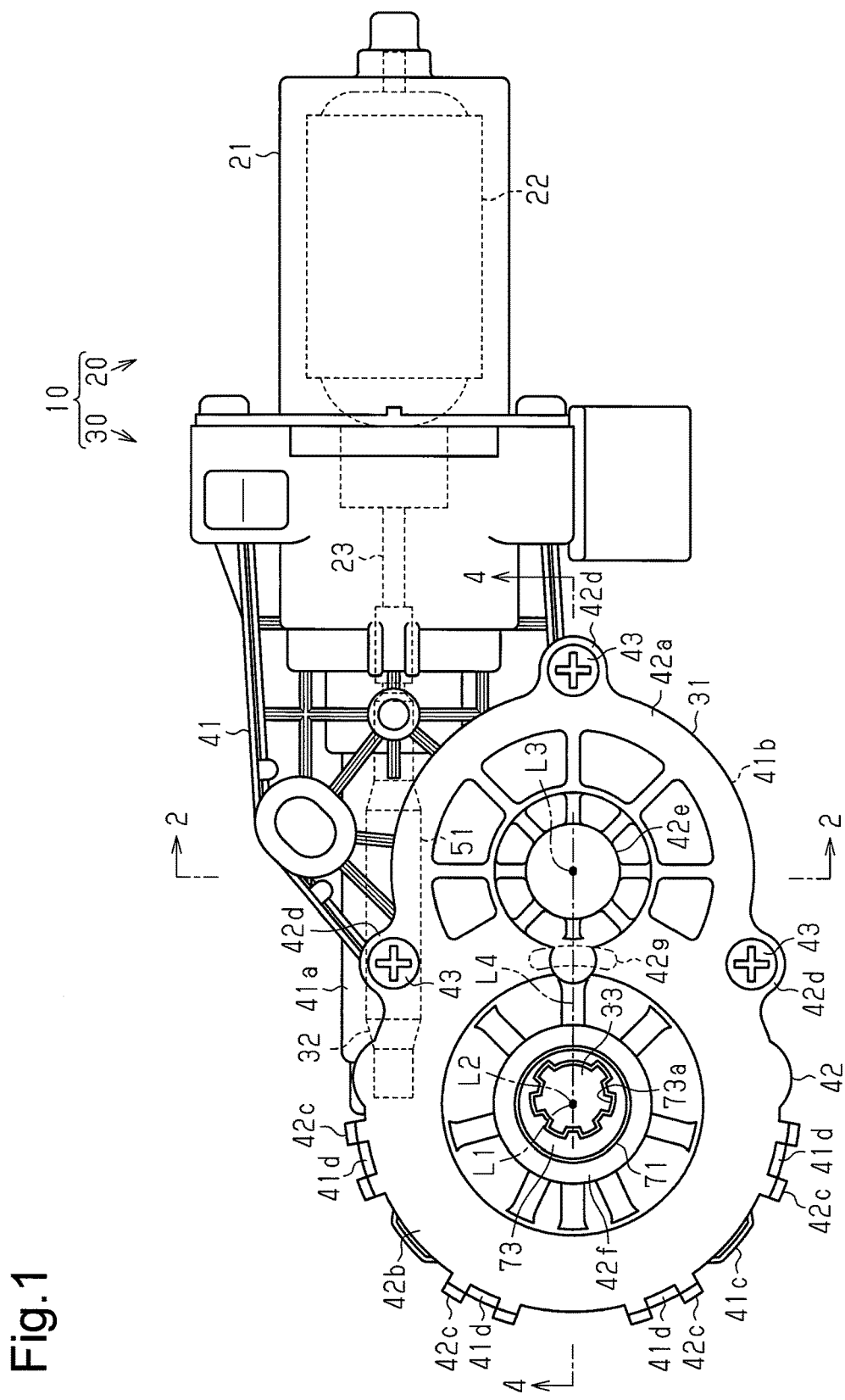
FIG. 1 is a front view showing a drive device according to a first embodiment of the present invention.

One embodiment of a drive device will now be described. As shown in FIG. 1, a drive device 10 includes a motor 20 and a reduction unit 30, which is coupled to the motor 20.

The motor 20 includes a yoke 21, which is tubular and has a closed end, magnets (not shown), which are fixed to an inner circumference of the yoke 21, and an armature 22, which is accommodated in the yoke 21. The motor 20 drives and rotates the armature 22. The armature 22 includes a rotation shaft 23, which includes a distal end that projects out of an opening of the yoke 21 and into the reduction unit 30. The reduction unit 30 includes an accommodation portion 31, a reduction drive 32, and an output unit 33.

Figure 2:
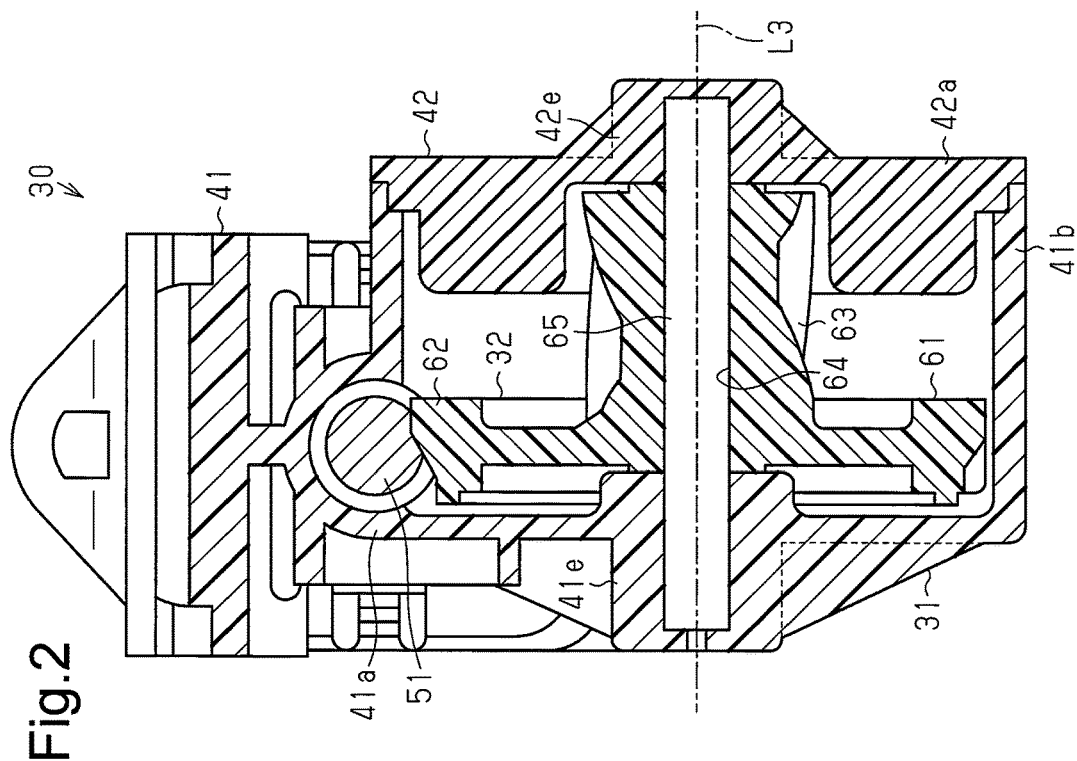
FIG. 2 is a cross-sectional view of the drive device taken along line 2-2 in FIG. 1.

As shown in FIGS. 1 and 2, the accommodation portion 31 includes a gear housing 41 and a housing cover 42. The gear housing 41 is made of, for example, a resin. The gear housing 41 includes a side end (right end in FIG. 1), which is coupled and fixed to the yoke 21. The side end is open, and a cavity extending into the gear housing 41 (toward left side in FIG. 1) defines a tubular worm accommodation portion 41a, which extends coaxially with the rotation shaft 23. The worm accommodation portion 41a accommodates a worm 51, which forms the reduction drive 32. The worm 51 is rotationally supported inside the worm accommodation portion 41a and coupled to the rotation shaft 23 so as to rotate integrally with the rotation shaft 23.

The gear housing 41 includes a first gear accommodation portion 41b, which is in communication with the worm accommodation portion 41a, located in a direction orthogonal to the axis (downward direction in FIG. 1) of the worm accommodation portion 41a. The first gear accommodation portion 41b is tubular and has a closed end and an open end (upper side as viewed in FIG. 1). Further, the gear housing 41 includes a second gear accommodation portion 41c, which is in communication with the first gear accommodation portion 41b. The second gear accommodation portion 41c is located beside the first gear accommodation portion 41b in the radial direction of the first gear accommodation portion 41b and in a direction orthogonal to the axis of the worm accommodation portion 41a (downward direction in FIG. 1). In the same manner as the first gear accommodation portion 41b, the second gear accommodation portion 41C is tubular and has a closed end and an open end (upper side as viewed in FIG. 1). The second gear accommodation portion 41c has a larger diameter than the first gear accommodation portion 41b. The openings of the first gear accommodation portion 41b and the second gear accommodation portion 41c are closed by the housing cover 42.

Figure 4A:
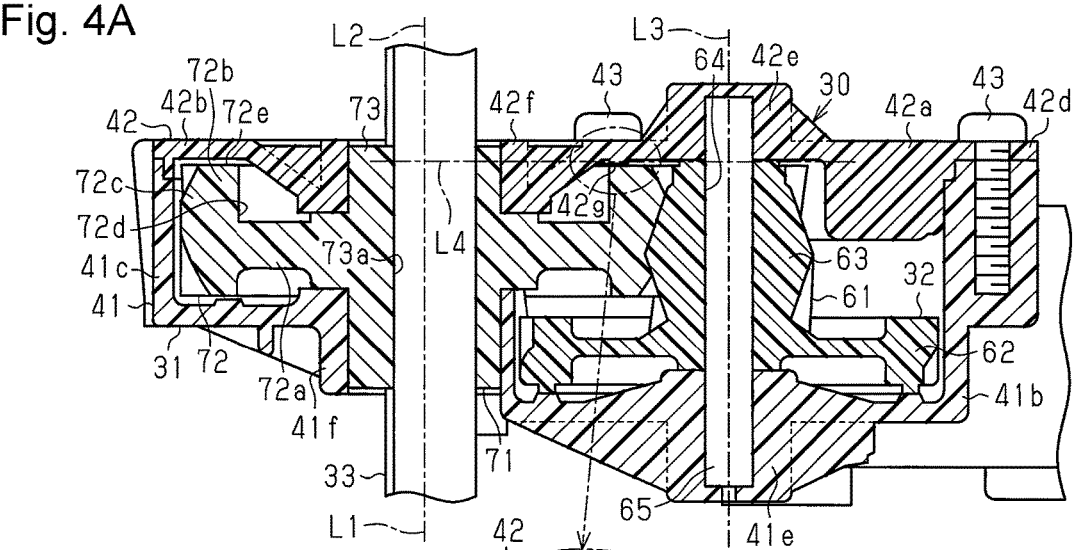
FIG. 4A is an entire cross-sectional view of the drive device taken along line 4-4 in FIG. 1.
Figure 5:
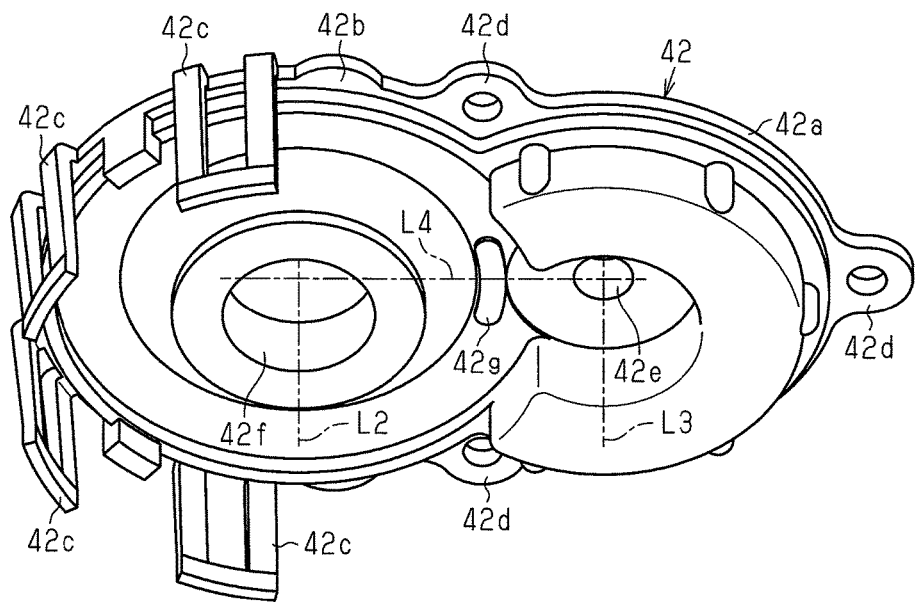
FIG. 5 is a perspective view of a housing cover shown in FIG. 1.

As shown in FIGS. 1, 4A, and 5, the housing cover 42 includes a circular first cover 42a and a circular second cover 42b. The first cover 42a, which is made of a resin, corresponds to the opening of the first gear accommodation portion 41b. The second cover 42b, which is formed integrally with the first cover 42a, corresponds to the opening of the second gear accommodation portion 41c. The second cover 42b has a larger diameter than the first cover 42a. In the housing cover 42, four engagement tabs 42c extend in the axial direction of the second cover 42b from the rim of the first cover 42a. Further, in the housing cover 42, one screw-fastened portion 42d extends from the rim of the first cover 42a, and two screw-fastened portions 42d extend from two locations in the boundary between the first cover 42a and the second cover 42b. The engagement tabs 42c are snap-fitted and engaged with engagement projections 41d, which project from the outer circumferential surface of the second gear accommodation portion 41c. Further, three screws 43 are inserted through the screw-fastened portions 42d and fastened to the gear housing 41. This fixes the housing cover 42 to the gear housing 41.

Figure 3:
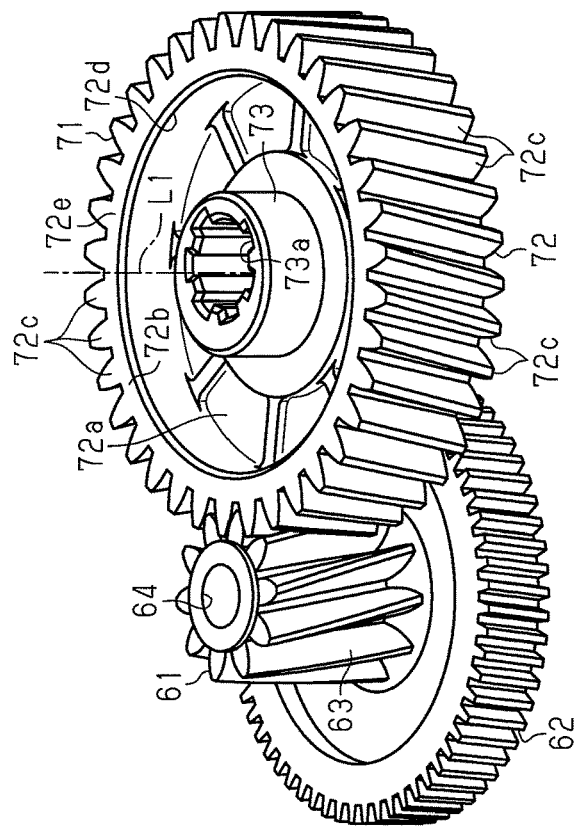
FIG. 3 is a perspective view of helical gears of the drive device shown in FIG. 1.

As shown in FIG. 2, the first gear accommodation portion 41b accommodates a first reduction gear 61. The first reduction gear 61, which is made of a resin, for example, polyacetal (POM), forms the reduction drive 32. As shown in FIG. 3, the first reduction gear 61 includes a circular worm wheel 62 and a small-diameter helical gear 63, which has a smaller diameter than the worm wheel 62. The small-diameter helical gear 63 includes teeth that are cut obliquely relative to the axis. The small-diameter helical gear 63 is formed integrally with one axial end surface of the worm wheel 62. The center axis of the worm wheel 62 corresponds to that of the small-diameter helical gear 63. As shown in FIG. 2, the radially central portion of the first reduction gear 61 includes a support hole 64, which extends through the first reduction gear 61 in the axial direction. A cylindrical support shaft 65 is fitted into the support hole 64. The first reduction gear 61 is rotatable integrally with the support shaft 65. The two axial ends of the support shaft 65 extend from the two axially opposite sides of the first reduction gear 61.

The radially central portion in the bottom of the first gear accommodation portion 41b includes an annular first rotation support 41e. Further, the radially central portion in the bottom of the first cover 42a includes an annular first rotation support 42e, which is paired with the first rotation support 41e. The first rotation support 41e and the first rotation support 42e close the axial ends of the accommodation portion 31, that is, the outer sides of the accommodation portion 31. In the accommodation portion 31, the first rotation support 41e and the first rotation support 42e are coaxial. One axial end of the support shaft 65 (left end in FIG. 2) is inserted into the first rotation support 41e, and the other axial end of the support shaft 65 (right end in FIG. 2) is inserted into the first rotation support 42e. The first rotation supports 41e and 42e rotationally support the support shaft 65. That is, the first rotation supports 41e and 42e rotationally support the first reduction gear 61, which is arranged in the first gear accommodation portion 41b, with the support shaft 65. The first reduction gear 61 is arranged in the first gear accommodation portion 41b so that the worm wheel 62 opposes the bottom of the first gear accommodation portion 41b and the small-diameter helical gear 63 opposes the first cover 42a. Further, the worm wheel 62 meshes with the worm 51.

As shown in FIG. 4A, the second gear accommodation portion 41c accommodates a second reduction gear 71. The second reduction gear 71, which is made of a resin such as polyacetal (POM), forms the reduction drive 32. As shown in FIG. 3, the second reduction gear 71 includes a circular large-diameter helical gear 72 and a cylindrical output support 73, which is formed integrally with the radially central portion of the large-diameter helical gear 72.

As shown in FIGS. 3 and 4A, the large-diameter helical gear 72 has a larger diameter than the small-diameter helical gear 63. The large-diameter helical gear 72 includes an annular thin portion 72a, an annular base 72b, and teeth 72c. The thin portion 72a extends from the outer circumferential surface of the output support 73 toward the radially outer side. The base 72b is formed integrally with the thin portion 72a at the outer circumference of the thin portion 72a. The teeth 72c project from the base 72b toward the radially outer side. The thin portion 72a has a smaller axial thickness than the base 72b. Thus, the large-diameter helical gear 72 includes a shallow recess 72d, which opens toward the housing cover 42. The shallow recess 72d is axially recessed between the base 72b and the output support 73. The teeth 72c are cut obliquely relative to the rotation axis L1 of the second reduction gear 71. Further, the two axial end surfaces of each tooth 72c are flush with the two axial end surfaces of the base 72b. The axial end surfaces of the base 72b and the tooth 72c define the axial end surfaces of the large-diameter helical gear 72. In the present embodiment, among the two axial end surfaces of the large-diameter helical gear 72, the one that opposes the housing cover 42 is referred to as the axial end surface 72e. The axial end surface 72e of the present embodiment is a flat surface that is orthogonal to the rotation axis L1 of the second reduction gear 71.

The output support 73 projects out of the two axially opposite sides of the radially central portion of the large-diameter helical gear 72. The output support 73 includes an output hole 73a, which extends through the output support 73 in the axial direction. The rod-shaped output unit 33, which rotates integrally with the second reduction gear 71, is inserted into the output hole 73a. The output unit 33 projects out of the two axial ends of the output support 73.

As shown in FIG. 4A, the radially central portion in the bottom of the second gear accommodation portion 41c includes an annular second rotation support 41f. Further, the radially central portion of the second cover 42b includes an annular second rotation support 42f, which is paired with the second rotation support 41f. In the accommodation portion 31, the second rotation support 41*f* and the second rotation support 42*f* are coaxial. One axial end of the output support 73 (lower end in FIG. 4A) is inserted into the second rotation support 41*f*, and the other axial end of the output support 73 (upper end in FIG. 4A) is inserted into the second rotation support 42*f*. The second rotation supports 41*f* and 42*f* rotationally support the output support 73. That is, the second rotation supports 41*f* and 42*f* rotationally support the second reduction gear 71, which is arranged in the second gear accommodation portion 41*c*. In the housing cover 42, the second rotation support 42*f* has a distal end (end of inner side of accommodation portion 31) that is inserted into the shallow recess 72*d* of the large-diameter helical gear 72 so that the second rotation support 42*f* and the base 72*b* are overlapped in the radial direction. One axial end of the output unit 33 extends through the inner side of the second rotation support 41*f* and projects out of the accommodation portion 31, and the other axial end of the output unit 33 extends through the inner side of the second rotation support 42*f* and projects out of the accommodation portion 31. An external load is connected to the output unit 33. The large-diameter helical gear 72 meshes with the small-diameter helical gear 63.

As shown in FIGS. 1, 2, and 4A, in the drive device 10, the drive force of the motor 20 is first transmitted from the rotation shaft 23 to the worm 51. The speed of the rotation transmitted from the rotation shaft 23 to the worm 51 is reduced in the reduction drive 32. Then, the rotation is output from the output unit 33 to the outside. More specifically, the rotation transmitted to the worm 51 is transmitted to the output unit 33 through a power transmission path and output from the output unit 33 to the outside. The power transmission path includes the worm wheel 62, the small-diameter helical gear 63, the large-diameter helical gear 72, and the output support 73.

As shown in FIG. 4A, the inner surface of the housing cover 42 (i.e., inner circumferential surface of accommodation portion 31) includes a restriction portion 42*g*. Among the small-diameter helical gear 63 and the large-diameter helical gear 72 that mesh with each other, the large-diameter helical gear 72 (output-side helical gear) is located closer to the output unit 33 than the small-diameter helical gear 63 (other helical gear) in the power transmission path of the reduction drive 32. The center axis of the second rotation support 42*f*, which supports the large-diameter helical gear 72, is referred to as the center axis L2. The center axis of the first rotation support 42*e*, which supports the small-diameter helical gear 63, is referred to as the center axis L3. The center axis L2 is parallel to the center axis L3. As shown in FIG. 1, a straight line extending through the center axis L2 and the center axis L3 as viewed in the axial direction of the second rotation support 42*f* (i.e., direction of center axis L2) is referred to as the straight line L4. As shown in FIG. 4A, the straight line L4 perpendicularly intersects the center axis L2 and the center axis L3.

Figure 4B:
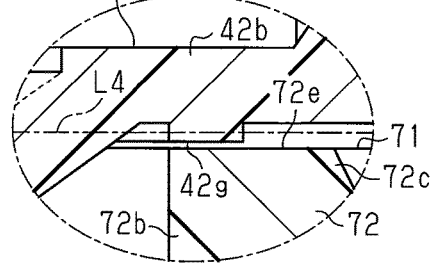
FIG. 4B is a partially enlarged view of FIG. 4A.

As shown in FIGS. 1, 4A, and 5, the restriction portion 42*g* is formed on the inner surface of the housing cover 42 within a range that includes the straight line L4. That is, the restriction portion 42*g* is located where at least part of the restriction portion 42*g* is axially overlapped with the straight line L4. More specifically, the restriction portion 42*g* is formed within a range that includes a section of the straight line L4 between the center axis L2 and the center axis L3. The restriction portion 42*g*, which is formed integrally with the housing cover 42, is formed on the inner surface of the second cover 42*b* around the boundary with the first cover 42*a*. Further, the restriction portion 42*g* projects toward the inner side of the accommodation portion 31 (bottom of first and second gear accommodation portion 41*b* and 41*c*) in the direction of the center axis L2 of the second rotation support 42*f*. In addition, the restriction portion 42*g* extends in an arcuate manner in the circumferential direction of the second rotation support 42*f*. As shown in FIGS. 1 and 5, the straight line L4 extends through the circumferentially middle part of the restriction portion 42*g* as viewed in the direction of the center axis L2. As shown in FIGS. 4A and 4B, a distal end surface of the restriction portion 42*g* is a flat surface that is orthogonal to the center axis L2 of the second rotation support 42*f*. The restriction portion 42*g* opposes the base 72*b* in the direction of the center axis L2. The height of the restriction portion 42*g* in the direction of the center axis L2 is set so that the restriction portion 42*g* does not contact the axial end surface 72*e* of the large-diameter helical gear 72 when a load applied to the output unit 33 is small (less than or equal to rated load). The height of the restriction portion 42*g* in the direction of the center axis L2 is set so that the distal end surface of the restriction portion 42*g* contacts and slides on the axial end surface 72*e* of the large-diameter helical gear 72 when the load applied to the output unit 33 is large (greater than rated load). For example, the height of the restriction portion 42*g* in the direction of the center axis L2 is set so that the gap between the restriction portion 42*g* and the base 72*b* is 0.05 to 0.45 mm. That is, the restriction portion 42*g* is configured to allow for slidable contact with the large-diameter helical gear 72 to restrict axial bending of the large-diameter helical gear 72.

The operation of the drive device 10 of the present embodiment will now be described.

In the drive device 10, when the drive force of the motor 20 rotates the worm 51, the speed of the rotation is reduced by the reduction drive 32 to increase torque. Then, the rotation is output from the output unit 33 to the outside. When no load is applied to the output unit 33 or when a low load (rated load) is applied to the output unit 33, the restriction portion 42*g* does not contact the axial end surface 72*e* of the large-diameter helical gear 72. When the load applied to the output unit 33 is large (greater than rated load), a thrust force is generated in the meshed portion of the large-diameter helical gear 72 and the small-diameter helical gear 63. The thrust force bends the large-diameter helical gear 72 in the axial direction and moves the large-diameter helical gear 72 toward the housing cover 42. As a result, the distal end surface of the restriction portion 42*g* contacts the axial end surface 72*e* of the large-diameter helical gear 72 in a slidable manner so that the restriction portion 42*g* restricts further bending of the large-diameter helical gear 72 in the axial direction.

The first embodiment has the advantages described below.

(1) The housing cover 42 includes the restriction portion 42*g*. The second rotation support 42*f*, which rotationally supports the large-diameter helical gear 72, includes the center axis L2. The first rotation support 42*e*, which rotationally supports the small-diameter helical gear 63, includes the center axis L3. The restriction portion 42*g* is located within a range that includes the straight line L4, which intersects the center axis L2 and the center axis L3. In general, when the large-diameter helical gear 72 is axially bent by the thrust force generated by the meshed portion of the large-diameter helical gear 72 and the small-diameter helical gear 63, the large-diameter helical gear 72 is bent around the above range. When a large load (greater than rated load) is applied to the output unit 33 from the outside, an increased thrust force in the meshed portion acts to bend the large-diameter helical gear 72 in the axial direction. In this case, the restriction portion 42g, which is configured to allow for slidable contact with the large-diameter helical gear 72, restricts axial bending of the large-diameter helical gear 72. This allows for insufficient meshing of the large-diameter helical gear 72 and the small-diameter helical gear 63 to be avoided.

(2) The restriction portion 42g contacts and slides on the axial end surface 72e of the large-diameter helical gear 72 and easily and effectively restricts axial bending of the meshed portion of the large-diameter helical gear 72 and the small-diameter helical gear 63. This easily and effectively avoids insufficient meshing of the large-diameter helical gear 72 and the small-diameter helical gear 63.

(3) When a load that is greater than the rated load is applied to the output unit 33, that is, when a thrust force generated by the meshed portion of the large-diameter helical gear 72 increases, the restriction portion 42g contacts the large-diameter helical gear 72 in a slidable manner. Accordingly, when the large-diameter helical gear 72 is likely to be bent in the axial direction, the restriction portion 42g contacts the large-diameter helical gear 72 in a slidable manner and restricts axial bending of the large-diameter helical gear 72. Since axial bending of the large-diameter helical gear 72 can be effectively restricted, insufficient meshing of the large-diameter helical gear 72 and the small-diameter helical gear 63 can be effectively avoided.

(4) When a load applied to the output unit 33 is smaller than the rated load, the restriction portion 42g does not contact the gear 72. Thus, when the load applied to the output unit 33 is smaller than the rated load, the drive force of the motor 20 is effectively output from the output unit 33.

(5) The mere arrangement of the restriction portion 42g, which has the shape of a simple projection projecting in the direction of the center axis L2 of the second rotation support 42f, in the housing cover 42 restricts axial bending of the large-diameter gear 72. This avoids insufficient meshing of the large-diameter helical gear 72 and the small-diameter helical gear 63, and thus limits increases in the manufacturing cost of the drive device 10.

(6) Since the restriction portion 42g restricts axial bending of the large-diameter helical gear 72, the axial thickness of the large-diameter helical gear 72 does not have to be increased to restrict axial bending of the large-diameter helical gear 72. This avoids insufficient meshing of the large-diameter helical gear 72 and the small-diameter helical gear 63 without enlarging the drive device 10 in the axial direction. Further, mold shrinkage and the generation of voids that would occur when molding the resin large-diameter helical gear 72 are reduced as compared with when the thickness of the large-diameter helical gear 72 is increased.

(7) The restriction portion 42g restricts axial bending of the large-diameter helical gear 72. This avoids insufficient meshing of the large-diameter helical gear 72 and the small-diameter helical gear 63 and reduces breakage of the teeth 72c of the large-diameter helical gear 72 that would occur when the large-diameter helical gear 72 and the small-diameter helical gear 63 are insufficiently meshed. Accordingly, the second reduction gear 71 can be formed from a resin material such as polyacetal (POM), which is less expensive than steel.

(8) The large-diameter helical gear 72 includes the thin portion 72a. Thus, the large-diameter helical gear 72 includes the shallow recess 72d. The distal end of the second rotation support 42f is inserted into the shallow recess 72d. This allows the second rotation support 42f to be elongated in the axial direction. Further, the restriction portion 42g restricts axial bending of the large-diameter helical gear 72 that is caused by the thrust force generated at the meshing portion with the small-diameter helical gear 63. Thus, even if the thin portion 72a is arranged in the large-diameter helical gear 72 and the axial length of the second rotation support 42f is increased, insufficient meshing is avoided in the large-diameter helical gear 72 and the small-diameter helical gear 63. In addition, the second rotation supports 41f and 42f further stably support the second reduction gear 71.

Second Embodiment

One embodiment of a drive device will now be described. In the second embodiment, like or same reference numerals are given to those components that are the same as the corresponding components of the first embodiment.

Figure 6A:
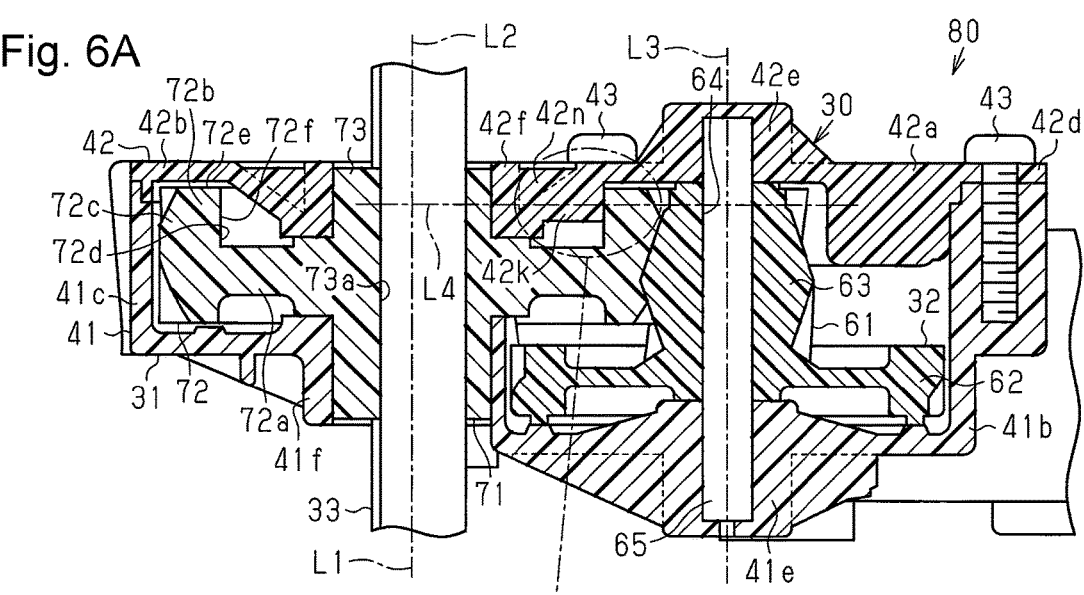
FIG. 6A is an entire cross-sectional view of a drive device according to a second embodiment of the present invention.

As shown in FIG. 6A, the base 72b of the large-diameter helical gear 72 includes a tubular inner circumferential surface 72f, which is parallel to the rotation axis L1 of the large-diameter helical gear 72.

Figure 6B:
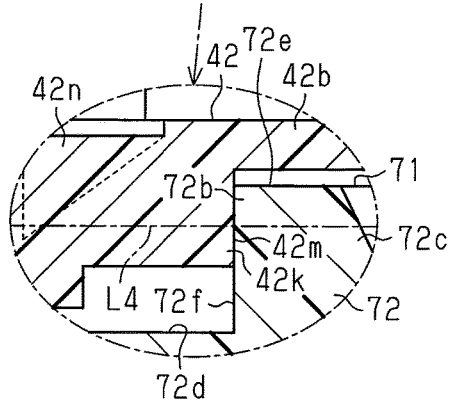
FIG. 6B is a partially enlarged view of FIG. 6A.
Figure 7:
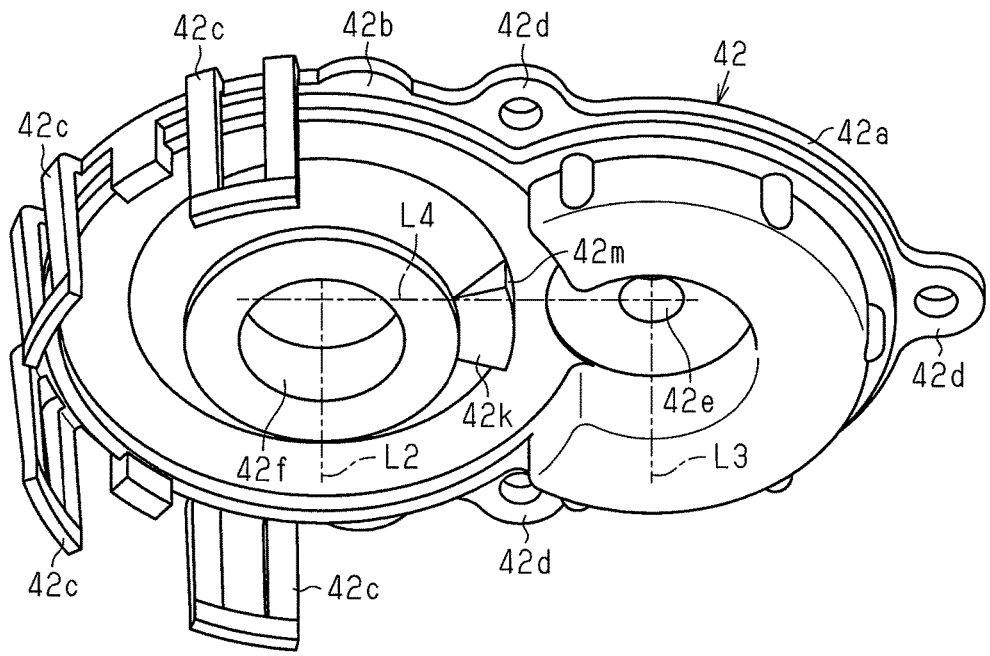
FIG. 7 is a perspective view of a housing cover shown in FIG. 6.

Instead of the restriction portion 42g of the first embodiment, a drive device 80 of the second embodiment includes a restriction portion 42k, which is arranged in the housing cover 42. The restriction portion 42k is formed on the inner surface of the housing cover 42 within a range that includes the straight line L4. That is, the restriction portion 42k is located where at least part of the restriction portion 42k is axially overlapped with the straight line L4. More specifically, the restriction portion 42k is formed within a range that includes a section of the straight line L4 between the center axis L2 and the center axis L3. The restriction portion 42k, which is formed integrally with the housing cover 42, is formed on the inner surface of the second cover 42b around the boundary with the first cover 42a. Further, the restriction portion 42k projects from the inner surface of the second cover 42b toward the inner side of the accommodation portion 31 in the direction of the center axis L2 of the second rotation support 42f. The restriction portion 42k axially opposes the thin portion 72a, which has a smaller thickness than the base 72b, and overlaps the base 72b in the radial direction. As shown in FIGS. 6A, 6B, and 7, the restriction portion 42k extends in an arcuate manner in the circumferential direction of the second rotation support 42f. The side surface of the restriction portion 42k located at the side opposite to the second rotation support 42f (i.e., side surface closer to first cover 42a) is referred to as the sliding surface 42m, which is arcuate and concentric with the second rotation support 42f. The sliding surface 42m contacts the inner circumferential surface 72f of the base 72b of the second reduction gear 71, which is supported by the second rotation supports 41f and 42f in a slidable manner. The end surface of the restriction portion 42k in the direction of the center axis L2 (lower end surface in FIG. 6A) of the second rotation support 42f does not contact the large-diameter helical gear 72.

Figure 8:
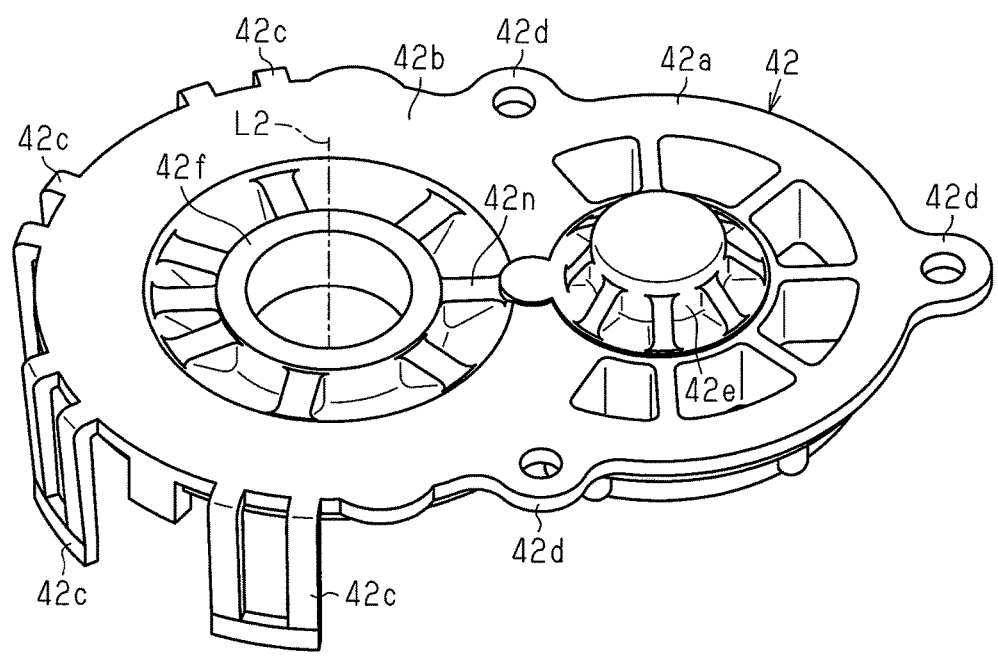
FIG. 8 is a perspective view of the housing cover shown in FIG. 6.

As shown in FIGS. 6A and 8, the outer surface of the housing cover 42 (i.e., outer surface of accommodation portion 31) includes a reinforcement rib 42n, which reinforces the restriction portion 42k. The reinforcement rib 42n is located where the restriction portion 42k is arranged with the large-diameter helical gear 72. The reinforcement rib 42n, which is formed integrally with the housing cover 42, is formed in the outer surface of the second cover 42b at the opposite side of the restriction portion 42k. More specifically, the reinforcement rib 42n is formed in the outer surface of the second cover 42b at the opposite side of the circumferentially middle part of the restriction portion 42k.

The reinforcement rib 42n is formed within a range that includes the straight line L4 as viewed in the direction of the center axis L2. The reinforcement rib 42n has the form of a flat plate that extends in the direction of the center axis L2 of the second rotation support 42f and is orthogonal to the circumferential direction of the second rotation support 42f. The reinforcement rib 42n includes a basal end (end of reinforcement rib 42n located close to the center axis L2 of the second rotation support 42f and located at an inner side of the accommodation portion 31) inclined so that the outer surface of the housing cover 42 becomes closer toward the radially outer side of the second rotation support 42f. This allows the reinforcement rib 42n to receive force that acts in the radial direction from the restriction portion 42k.

The operation of the drive device 80 of the present embodiment will now be described.

In the drive device 80, when the motor 20 is driven, the large-diameter helical gear 72 rotates as the inner circumferential surface 72f of the base 72b contacts and slides on the sliding surface 42m. When a load applied to the output unit 33 becomes large, a thrust force is generated at the meshed portion of the large-diameter helical gear 72 and the small-diameter helical gear 63. The thrust force acts to bend the large-diameter helical gear 72 in the axial direction toward the housing cover 42. However, the inner circumferential surface 72f of the base 72b contacts the sliding surface 42m of the restriction portion 42k. Thus, the restriction portion 42k restricts axial bending of the large-diameter helical gear 72.

As described above, the second embodiment has the following advantages in addition to (5) to (8) of the first embodiment.

(1) The housing cover 42 includes the restriction portion 42k. The second rotation support 42f, which supports the large-diameter helical gear 72, includes the center axis L2. The first rotation support 42e, which supports the small-diameter helical gear 63, includes the center axis L3. The restriction portion 42k is located within a range that includes the straight line L4, which intersects the center axis L2 and the center axis L3. In general, when the large-diameter helical gear 72 is axially bent by the thrust force generated by the meshed portion of the large-diameter helical gear 72 and the small-diameter helical gear 63, the large-diameter helical gear 72 is bent around the above range. When a large load is applied to the output unit 33 from the outside, an increased thrust force in the meshed portion acts to bend the large-diameter helical gear 72 in the axial direction. In this case, the restriction portion 42k, which is configured to allow for slidable contact with the large-diameter helical gear 72, restricts axial bending of the large-diameter helical gear 72. This allows for insufficient meshing of the large-diameter helical gear 72 and the small-diameter helical gear 63 to be avoided.

(2) The restriction portion 42k axially opposes the thin portion 72a, which has a smaller thickness than the base 72b, and radially overlaps the base 72b. The restriction portion 42k is configured to allow for slidable contact with the inner circumferential surface 72f of the base 72b of the large-diameter helical gear 72. This easily avoids axial bending at the meshed portion of the large-diameter helical gear 72 and the small-diameter helical gear 63 without enlarging the accommodation portion 31 in the axial direction.

(3) The reinforcement rib 42n reinforces the restriction portion 42k. Since the reinforcement rib 42n increases the strength of the restriction portion 42k, the restriction portion 42k withstands a greater force that is applied from the large-diameter helical gear 72.

Each of the above embodiments may be modified as described below.

In the first and second embodiments, the restriction portions 42g and 42k are arranged within a range that includes the straight line L4 (between center axis L2 and center axis L3) only at a location corresponding to a portion of the large-diameter helical gear 72 in the circumferential direction. However, if the restriction portions 42g and 42k are formed at least within the range that includes the straight line L4 as viewed in the axial direction, the restriction portions 42g and 42k may have a different structure.

For example, the restriction portion may be arranged to restrict axial bending of the large-diameter helical gear 72 over the entire circumference.

Figure 9:
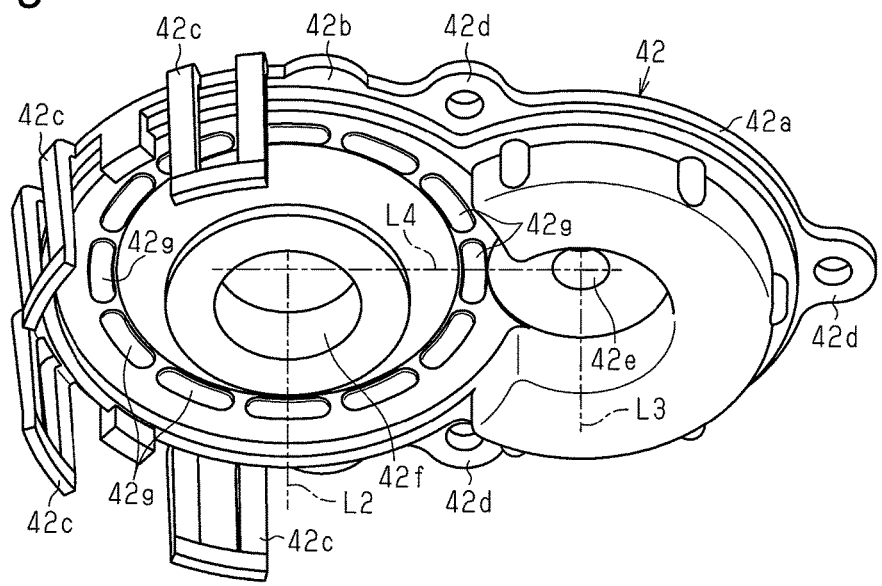
FIG. 9 is a perspective view showing a housing cover in a further example.
Figure 10A:
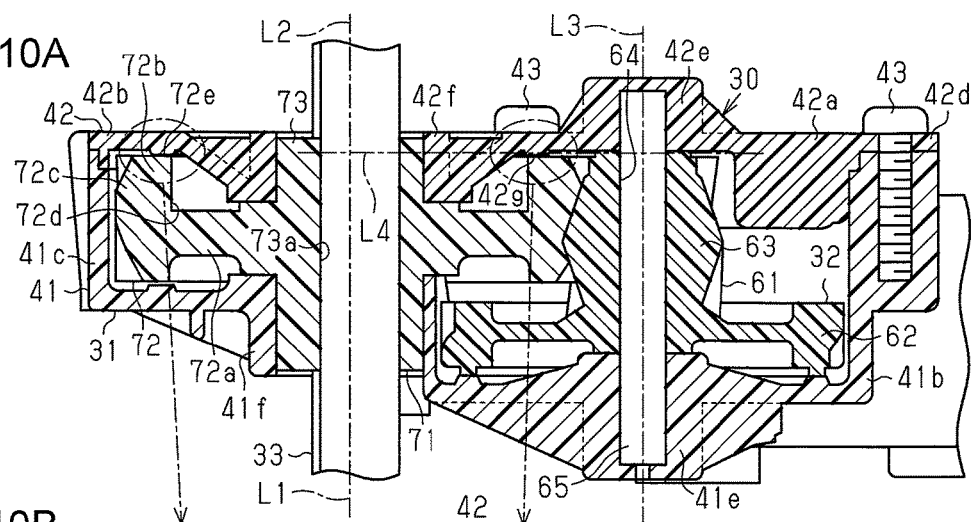
FIG. 10A is an entire cross-sectional view of the drive device in the further example shown in FIG. 9, and FIGS. 10B and 10C are partially enlarged views of FIG. 10A.
Figure 10B:
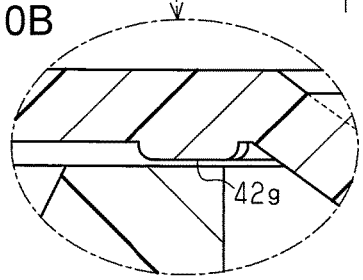
Figure 10C:
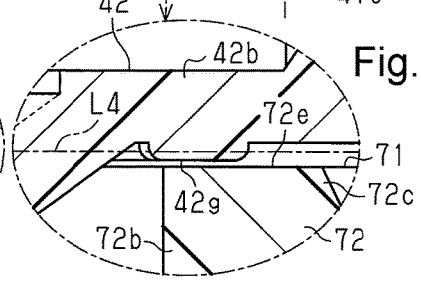

More specifically, a modification may be made as shown in FIGS. 9 and 10. In this example, the housing cover 42 includes a plurality of (e.g., twelve) restriction portions 42g, which are arranged in the circumferential direction of the large-diameter helical gear 72. The restriction portions 42g are arranged within the range that includes the straight line L4. The restriction portions 42g are configured to allow for slidable contact with the entire circumference of the large-diameter helical gear 72 to restrict axial bending of the large-diameter helical gear 72 over the entire circumference. The restriction portions 42g have identical shapes and are arranged at regular intervals. However, the restriction portions 42g may have different shapes and do not have to be arranged at regular intervals. Further, the restriction portions may extend continuously in the circumferential direction of the large-diameter helical gear 72, or in an annular manner, to restrict axial bending of the large-diameter helical gear 72 over the entire circumference.

In such a structure, even when the large-diameter helical gear 72 acts to bend in the axial direction at different positions in the circumferential direction outside the range that includes the straight line L4, the restriction portions 42g restrict axial bending of the large-diameter helical gear 72. This avoids insufficient meshing of the large-diameter helical gear 72 and the small-diameter helical gear 63. This also reduces the adverse effects of sink marks as compared with when only a portion in the circumferential direction includes a restriction portion. Further, the moldability of the large-diameter helical gear 72 is improved. Moreover, material costs are decreased when a plurality of the restriction portions 42g are arranged in the circumferential direction of the large-diameter helical gear 72 as compared with when, for example, an annular restriction portion 42g is formed.

Additionally, in this example (refer to FIGS. 9 and 10), each restriction portion 42g (end directed to bottoms of first and second gear accommodation portions 41b and 41c) has a distal end including a chamfered corner. This reduces, for example, a force that is locally applied to the large-diameter helical gear 72 even when the large-diameter helical gear 72 slightly tilts and slides. Further, abrasion is reduced in sliding portions.

In the first embodiment, when a load applied to the output unit 33 is greater than the rated load, the axial end surface 72e of the large-diameter helical gear 72 contacts the restriction portion 42g in a slidable manner. However, regardless of how large the load applied to the output unit 33 is, the restriction portion 42g may be formed to contact the axial end surface 72e of the large-diameter helical gear 72 in a slidable manner. Further, the restriction portion 42g may be formed to contact the axial end surface 72e of the large-diameter helical gear 72 in a slidable manner when the load is applied to the output unit 33.

In the second embodiment, the sliding surface 42m of the restriction portion 42k always contacts the inner circumferential surface 72f of the base 72b of the large-diameter helical gear 72 in a slidable manner. However, the restriction portion 42k may be formed so that the inner circumferential surface 72f of the base 72b does not contact the sliding surface 42m when the load applied to the output unit 33 is small. Further, the restriction portion 42k may be formed so that the inner circumferential surface 72f of the base 72b contacts the sliding surface 42m when the load applied to the output unit 33 is large (greater than rated load). In addition, the restriction portion 42k may be formed to contact the inner circumferential surface 72f in a slidable manner when a load is applied to the output unit 33.

In the first embodiment, the restriction portion 42g contacts the axial end surface 72e of the large-diameter helical gear 72 in a slidable manner to restrict axial bending of the large-diameter helical gear 72. In the second embodiment, the restriction portion 42k contacts the inner circumferential surface 72f of the base 72b of the large-diameter helical gear 72 in a slidable manner to restrict axial bending of the large-diameter helical gear 72. However, the restriction portion 42g and the restriction portion 42k may be configured to contact both of the axial end surface 72e of the large-diameter helical gear 72 and the inner circumferential surface 72f of the base 72b in a slidable manner to restrict axial bending of the large-diameter helical gear 72.

In the first embodiment, the restriction portion 42g is formed integrally with the housing cover 42. However, the restriction portion 42g may be separate from the housing cover 42 and fixed to the inner surface of the housing cover 42. The same applies to the restriction portion 42k of the second embodiment.

In each of the above embodiments, the drive devices 10 and 80 include two helical gears, namely, the large-diameter helical gear 72 and the small-diameter helical gear 63. However, in the drive device 10, the number of helical gears of the reduction drive 32 does not have to be two and may be three or more. Among the three or more helical gears, in the two meshed helical gears (any of two meshed helical gears), the helical gear that is closer to the output unit 33 in the power transmission path of the reduction drive 32 is referred to as the output-side helical gear. The accommodation portion 31 includes the restriction portion 42g (or restriction portion 42k) arranged in the accommodation portion 31. The restriction portion 42g (or restriction portion 42k) is located within a range that includes a straight line intersecting the center axis of a rotation support that supports the output-side helical gear and intersecting the center axis of a rotation support that supports a helical gear that meshes with the output-side helical gear. The restriction portion 42g (or restriction portion 42k) is configured to allow for slidable contact with the output-side helical gear to restrict axial bending of the output-side helical gear.

The invention claimed is:

1. A drive device comprising:
a reduction drive that reduces a speed of rotation produced by a motor, wherein the reduction drive includes at least two resin helical gears meshed with each other;
an accommodation portion that accommodates the reduction drive, wherein the accommodation portion includes rotation supports that respectively support the at least two helical gears in a rotatable manner; and
an output unit that outputs the rotation, of which the speed has been reduced by the reduction drive, to an outer side, wherein the accommodation portion includes a gear housing, which includes a gear accommodation portion capable of accommodating the at least two helical gears, and a housing cover, which closes an opening of the gear accommodation portion,
the at least two helical gears include an output-side helical gear and another helical gear,
the output-side helical gear is located closer to the output unit than the other helical gear in a power transmission path of the reduction drive,
the rotation supports include a rotation support that supports the output-side helical gear and includes a first center axis and a rotation support that supports the other helical gear and includes a second center axis,
the housing cover includes at least one restriction portion disposed so as to intersect a straight line intersecting the first center axis and the second center axis,
the at least two helical gears are configured so that a thrust force, which directs from a bottom of the gear accommodation portion toward the housing cover, acts on a meshed portion of the at least two helical gears,
the restriction portion projects from the housing cover toward the bottom of the gear accommodation portion,
the output-side helical gear includes a first axial end surface facing toward the housing cover, and a second axial end surface facing toward the bottom of the gear accommodation portion, and
the restriction portion is configured to allow for slidable contact with the first axial end surface of the output-side helical gear, which has received the rotation from the other helical gear, to restrict axial bending of the output-side helical gear caused by the thrust force acting on the meshed portion.

2. The drive device according to claim 1, wherein the output-side helical gear includes a tubular inner circumferential surface parallel to a rotation axis of the output-side helical gear, and
the restriction portion is configured to allow for slidable contact with the inner circumferential surface of the output-side helical gear.

3. The drive device of claim 1, wherein the restriction portion is located adjacent to a portion where the two helical gears are meshed with each other.

4. The drive device of claim 1, wherein
the housing cover includes a first cover that covers the other helical gear, and a second cover that covers the output-side helical gear, and
the restriction portion is located at a boundary between the first cover and the second cover.

5. The drive device according to claim 1, wherein the restriction portion is configured to allow for slidable contact with the output-side helical gear at least when a load is applied to the output unit.

6. The drive device of claim 5, wherein the restriction portion is configured to avoid slidable contact with the output-side helical gear when a load applied to the output unit is smaller than a rated load.

7. The drive device according to claim 1, wherein the restriction portion is configured to allow for slidable contact over an entire circumference of the output-side helical gear to restrict axial bending of the output-side helical gear over the entire circumference.

8. The drive device of claim 7, wherein the restriction portion includes restriction portions arranged in a circumferential direction of the output-side helical gear.

* * * * *

UNITED STATES PATENT AND TRADEMARK OFFICE
CERTIFICATE OF CORRECTION

PATENT NO. : 10,502,282 B2
APPLICATION NO. : 14/881642
DATED : December 10, 2019
INVENTOR(S) : Yasufumi Fujii Page 1 of 1

It is certified that error appears in the above-identified patent and that said Letters Patent is hereby corrected as shown below:

On the Title Page

Item (73):
Delete "Kariva" and insert --Kariya--.

Signed and Sealed this
Eleventh Day of February, 2020

Andrei Iancu
*Director of the United States Patent and Trademark Office*